Sept. 24, 1957 W. C. ESPENLAUB ET AL 2,807,661

MATRIXING APPARATUS FOR A COLOR-SIGNAL TRANSLATING SYSTEM

Filed Nov. 24, 1953 3 Sheets-Sheet 1

MATRIXING APPARATUS FOR A COLOR-SIGNAL TRANSLATING SYSTEM

Filed Nov. 24, 1953 3 Sheets-Sheet 2

United States Patent Office 2,807,661

Patented Sept. 24, 1957

2,807,661

MATRIXING APPARATUS FOR A COLOR-SIGNAL TRANSLATING SYSTEM

Walter C. Espenlaub, Great Neck, and Bernard D. Loughlin, Lynbrook, N. Y., assignors to Hazeltine Research, Inc., Chicago, Ill., a corporation of Illinois Application November 24, 1953, Serial No. 394,082

13 Claims. (Cl. 178—5.4)

*General*

Figure 1:
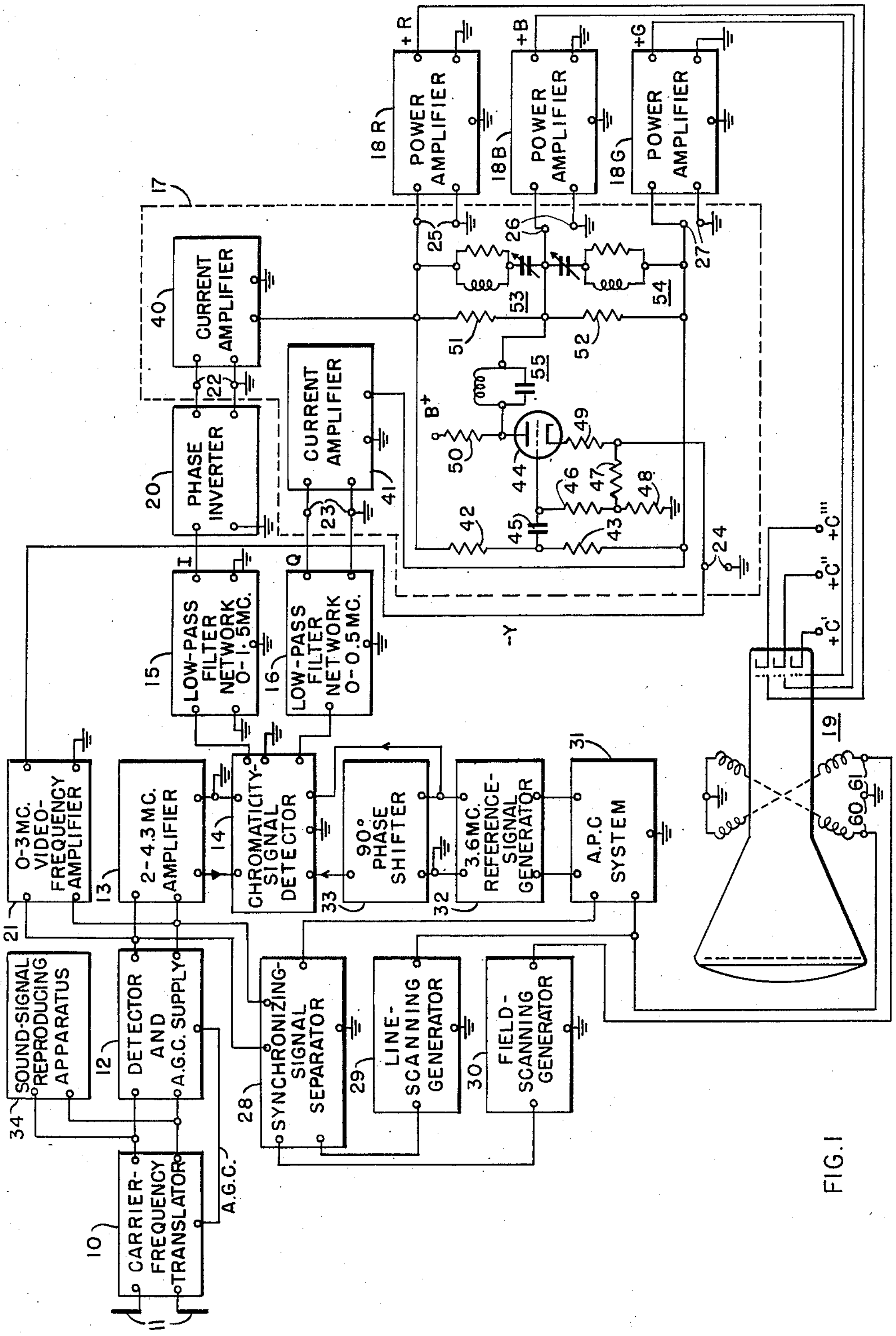

The present invention is directed to matrixing apparatus for color video-frequency signal-translating systems and, particularly, to such apparatus in color-television receivers for developing from a pair of signals individually representative of different components of the color of a televised image signals representative of other different components of the color of the aforesaid image.

In the form of color-television system described in an article in "Electronics" for February, 1952 entitled "Principles of NTSC compatible color television" at pages 88–95, inclusive, information representative of a scene in color being televised is utilized to develop at the transmitter two substantially simultaneous signals, one of which is primarily representative of the luminance and the other representative of the chromaticity of the image. To develop the latter signals, the scene being televised is viewed by one or more television cameras to develop color signals individually representative of such primary colors as green, red, and blue of the scene and these signals are combined in a manner more fully described in the aforesaid article to develop a signal which primarily represents all of the luminance or brightness information relating to the televised scene. Additionally, these color signals or signals representative thereof are individually applied as modulation signals to a subcarrier wave signal developed at the transmitter, effectively to modulate the latter signal at predetermined phase points thereof to develop the signal representative of the chromaticity of the scene being televised. Conventionally, the modulated subcarrier wave signal or chromaticity signal has a predetermined frequency less than the highest video frequency, for example, a frequency of approximately 3.6 megacycles, and has amplitude and phase characteristics related to the saturation and hue of the color being transmitted. In the specific form of such system, as described in the aforementioned article, the three color signals are initially modified to become at least two color-difference signals, in other words, to become signals such that when they are individually added in a receiver to the luminance signal, color signals will be developed. Such color-difference signals are usually, but not necessarily, limited in band width to less than 2 megacycles and different ones thereof may have different band widths. The color-difference signals are utilized to modulate the subcarrier wave signal at quadrature-phase points thereof. In one embodiment of such system, which will be considered more fully hereinafter, the phase axes of such quadrature signals do not coincide with any the three phase axes of the signals representative of the primary colors in the system as such signals inherently occur as modulation components of the subcarrier wave signal. It has become conventional to designate the quadrature signals as I and Q signals and the color-difference signals as G–Y, R–Y, and B–Y signals, the latter three signals representing respectively the green, red, and blue colors of the image. For reasons which need not be considered more fully herein, the quadrature signal I is usually proportioned to have a band width of approximately 1.3 megacycles, while the signal Q has a band width of approximately 0.4 megacycle. After the modulated subcarrier wave signal including the I and Q signals as modulation components has been developed, the latter wave signal is combined with the luminance signal in an interlaced manner to form in a pass band common to both signals a resultant composite video-frequency signal which is transmitted in a conventional manner.

A receiver in such a television system intercepts the transmitted signal and initially derives therefrom the chromaticity signal and the luminance or brightness signal. The quadrature-modulation components of the chromaticity signal, specifically, the I and Q signals, are derived by a detection means which is designed to operate in synchronism and in proper phase relation with the subcarrier wave-signal modulating means at the transmitter. In view of the lack of coincidence between the quadrature-phase axes of the I and Q signals and the phase axes of the three color-difference signals as modulation signals of the subcarrier wave signal, the detection means further comprises a signal-combining circuit for combining components of the derived I and Q signals to develop the color-difference signals G–Y, R–Y, and B–Y. The color difference signals, comprising chromaticity information, and the derived luminance signal are combined to develop color signals individually representative of the green, red, and blue of the televised image. After being effectively combined, these color signals are utilized in an image-reproducing apparatus to cause this apparatus to develop a color reproduction of the televised scene.

In present detection means in color-television receivers for developing color-difference signals for utilization in such receivers, detection circuits are included for deriving the I and Q signals from the modulated subcarrier wave signal. Since the I and Q signals do not lend themselves directly to utilization by available image-reproducing apparatus, a matrixing apparatus is utilized to combine components of the I and Q signals in different proportions and senses to develop color-difference signals which may be utilized by such image-reproducing apparatus. Such detection circuits and particularly the matrixing apparatus therein tend to become complex, cumbersome, and expensive because of the multiplicity of circuits included to perform the many varied operations, especially if such operations are performed as at present in a step-by-step manner.

In a copending application, Serial No. 359,734, filed June 5, 1953, by Donald Richman, and entitled "Matrixing Apparatus for a Color-Television System" there has been described a form of matrixing apparatus which is less complex and cumbersome than conventional such apparatus. However, the apparatus described in the copending application does utilize at least two vacuum tubes or their equivalent and the circuit elements normally required with such tubes. It may be desirable further to decrease the number of such tubes and circuit elements without deleteriously affecting the quality of operation of such apparatus. Also, such apparatus may require additional circuits for effecting combination of the luminance and color-difference signals.

It is, therefore, an object of the present invention to provide a new and improved matrixing apparatus for a color video-frequency signal-translating system which does not have the disadvantages and limitations of prior such apparatus.

It is also an object of the invention to provide for use in a color video-frequency signal-translating system a new and improved matrixing apparatus which includes an exceptionally small number of circuit elements to accomplish its purpose.

It is a further object of the invention to provide for a color video-frequency signal-translating system a new and improved matrixing apparatus in which the circuit elements thereof perform multiple functions.

It is a further object of the invention to provide for a color video-frequency signal-translating system a new and improved matrixing apparatus which utilizes only one triode vacuum tube or the equivalent thereof and a minimum of other circuit elements.

In accordance with the present invention, there is provided in a color video-frequency signal-translating system a matrixing apparatus for developing from a pair of signals, individually representative of different video-frequency color components and collectively representative of the chromaticity of an image, other signals representative of other different video-frequency color components collectively representative of the chromaticity of the image. The matrixing apparatus comprises a pair of input circuits for individually supplying individual ones of the pair of signals and a first impedance network including a phase inverter having a load circuit and coupled to the pair of input circuits for developing from the pair of signals a phase-inverted composite signal in the load circuit. The apparatus also comprises a second impedance network coupled to the input circuits and the load circuit and jointly responsive to the composite signal and the pair of signals for developing in the load circuit a resultant signal which is representative of one of the other different components and for developing in the second network from at least one of the pair of signals and the resultant signal at least another one of the other different signals.

For a better understanding of the present invention, together with other and further objects thereof, reference is had to the following description taken in connection with the accompanying drawings, and its scope will be pointed out in the appended claims.

Figure 2A:
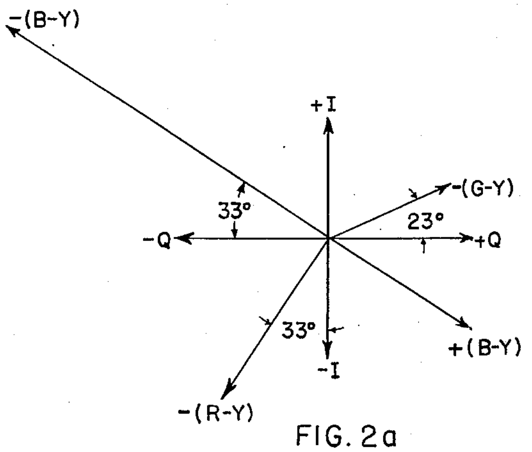
Figure 2B:
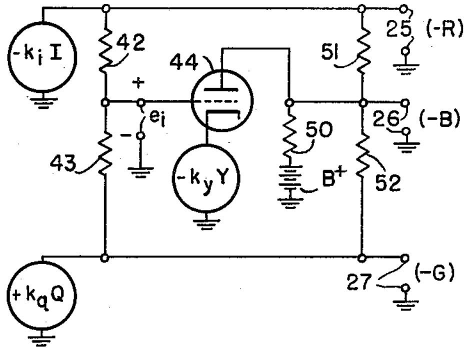
Figure 3:
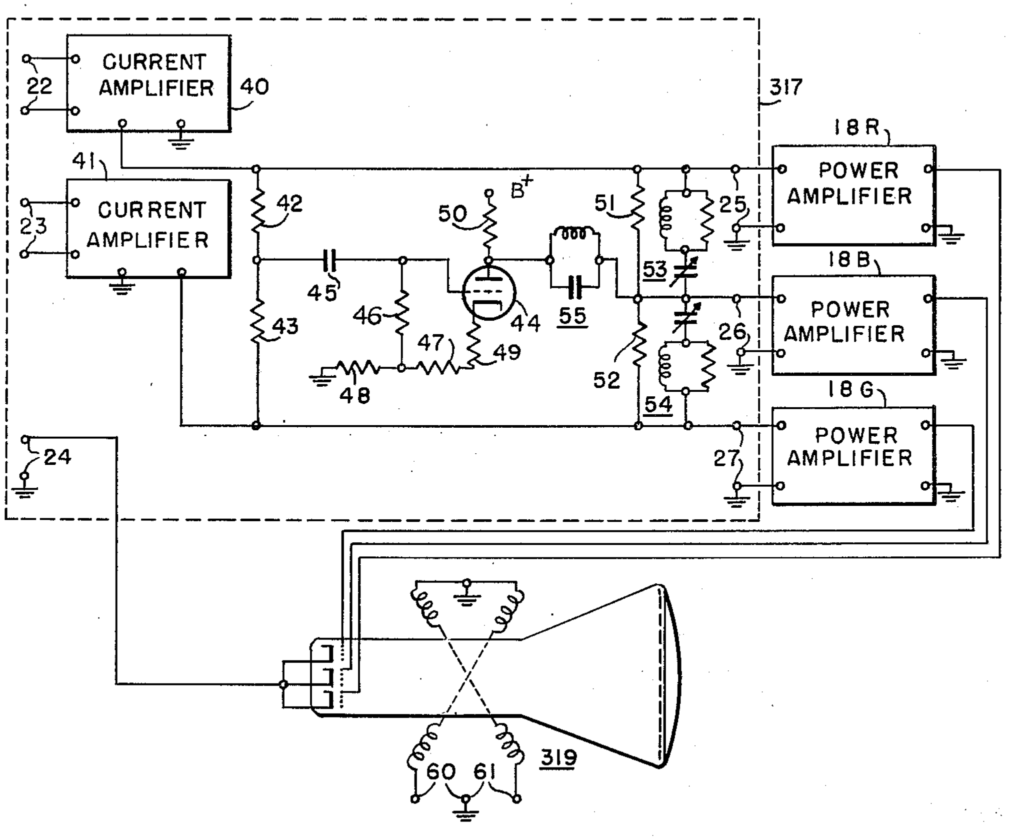
Figure 4:
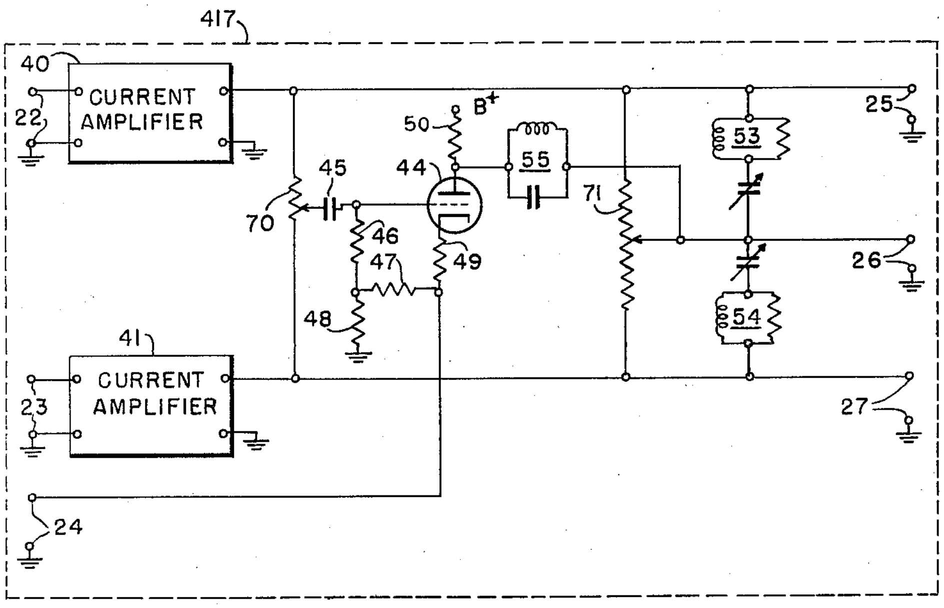

Referring to the drawings:

Fig. 1 is a schematic diagram, partially circuit, of a color-television receiver having a color video-frequency signal-translating system including a matrixing apparatus in accordance with the present invention;

Fig. 2*a* is a graph useful in explaining the operation of the matrixing apparatus of Fig. 1;

Fig. 2*b* is an equivalent circuit diagram useful in explaining the operation of the matrixing apparatus of Fig. 1;

Fig. 3 is a schematic diagram, partially circuit, of a portion of a television receiver including a modified form of the matrixing apparatus of Fig. 1, and Fig. 4 is a circuit diagram of a modified form of the matrixing apparatus of Fig. 1.

*General description of receiver of Fig. 1*

Referring now to Fig. 1 of the drawings, there is represented a color-television receiver of the superheterodyne type such as may be used in a color-television system of the type previously discussed herein and in the aforesaid "Electronics" article. It is preferable, though not essential, that properly developed luminance and chromaticity signals, which will be considered more fully hereinafter, are utilized in such a television system. The receiver includes a carrier-frequency translator 10 having an input circuit coupled to an antenna system 11. It will be understood that the unit 10 may include in a conventional manner one or more stages of wave-signal amplification, an oscillator-modulator, and one or more stages of intermediate-frequency amplification. Coupled in cascade with the output circuit of the unit 10, in the order named, are a detector and automatic-gain-control (AGC) supply 12, an amplifier 13 having a pass band preferably of 2–4.3 megacycles, a chromaticity-signal detector 14 having a pair of output circuits, low-pass filter networks 15 and 16 having pass bands of 0–1.5 and 0–0.5 megacycles, respectively, and individually coupled to different ones of the output circuits of the detector 14, a phase inverter 20 coupled to the output circuit of the network 15, a matrixing apparatus 17 in accordance with the present invention and to be described more fully hereinafter and coupled to the units 16 and 20, and three power amplifiers 18R, 18B, and 18G individually having input circuits coupled to different ones of three output circuits of the apparatus 17 and individually having output circuits coupled to different ones of three control electrodes in an image-reproducing device 19.

The amplifier 13 is an amplifier for the chrominance or modulated subcarrier wave signal. The detector 14 may be of a conventional type for deriving positive I and Q components from an applied modulated subcarrier wave signal. The details of such a detector for deriving other components of the subcarrier wave signal are more fully considered in the aforementioned article in "Electronics." The detector 14 need not differ physically from that described in such article but the phasing of the signals applied thereto is such that the components I and Q are derived rather than other components at other phase points of the subcarrier wave signal. The nature of such phasing is fully described in the "Electronics" article. In the simplest form thereof, such detector may comprise a pair of diodes to one electrode of each of which the signal translated through the amplifier 13 is applied and to the other electrodes of such diodes there are individually applied different signals having the frequency of the subcarrier wave signal and so phased with respect thereto as to heterodyne therewith to derive the I and Q signals at the proper phase points thereof. In a more complex form, such diodes may be replaced by pentodes to provide constant-current output signals and the derived I and Q signals may be of opposite phase thereby eliminating the need for the phase inverter 20.

The device 19 is conventional and may, for example, comprise a single cathode-ray tube having a plurality of cathodes and a plurality of control electrodes, different pairs of the cathode-control electrode circuits being individually responsive to different color signals, as will be explained more fully hereinafter, and including an arrangement for directing the beams emitted from the cathodes individually onto different phosphors for developing different primary colors. Such a tube is more fully described in an article entitled "General description of receivers for the dot-sequential color television system which employ direct-view tri-color kinescopes" in the RCA Review for June 1950 at pages 228–232, inclusive. It should be understood that other suitable types of color-television image-reproducing devices may be employed.

An output circuit of the detector 12 is coupled through an amplifier 21, preferably having a pass band of 0–3 megacycles, for translating the luminance or brightness signal to a pair of input terminals 24, 24 in the matrixing apparatus 17. The units 13–17, inclusive, 18R, 18B, 18G, and 21 comprise a color video-frequency signal-translating system in the receiver of Fig. 1.

An output circuit of the detector 12 is also coupled through a synchronizing-signal separator 28 to a line-scanning generator 29 and a field-scanning generator 30, output circuits of the latter units being coupled, respectively, to line-deflection and field-deflection windings of the image-reproducing device 19.

Output circuits of the synchronizing-signal separator 28 and of the generator 29 are coupled to an automatic-phase-control system 31 which is connected to a signal generator 32. The unit 32 is for developing a signal preferably having the frequency of the aforementioned subcarrier wave signal, that is, a frequency of approximately 3.6 megacycles. The output circuit of the generator 32 is coupled directly and through a 90° phase shifter 33 to input circuits of the chromaticity-signal detector 14.

The AGC supply of the unit 12 is connected through the conductor identified as AGC to input terminals of one or more of the stages in the unit 10 to control the gains of such stages to maintain the signal input to the detector 12 within a relatively narrow range for a wide range of received signal intensities. A sound-signal reproducing unit 34 is also connected to an output circuit of the unit 10 and it may include stages of intermediate-frequency amplification, a sound-signal detector, stages of audio-frequency amplification, and a sound-reproducing device.

It will be understood that the various units and circuit elements thus far described, with the exception of the matrix apparatus 17, may be of any conventional construction and design, the details of such units and circuit elements being well known in the art and requiring no further description.

*General operation of receiver of Fig. 1*

Considering briefly now the operation of the receiver of Fig. 1 as a whole, a desired composite television signal preferably of the constant luminance type is intercepted by the antenna system 11, is selected, amplified, converted to an intermediate frequency, and further amplified in the unit 10, and the video-frequency modulation components thereof are derived in the detector 12. These video-frequency modulation components comprise synchronizing components, the aforementioned modulated wave signal or chromaticity signal, and a luminance or brightness signal. The luminance or brightness signal is further amplified in the amplifier 21 and applied through the terminals 24, 24 to the matrixing apparatus 17. The synchronizing components including line-frequency and field-frequency synchronizing signals as well as a color burst signal for synchronizing the operation of the chromaticity-signal detector 14 are separated from the video-frequency components and from each other in the synchronizing-signal separator 28. The line-frequency and field-frequency synchronizing components are applied, respectively, to the units 29 and 30 to synchronize the operation of these generators with the operation of related units at the transmitter. These generators supply signal of saw-tooth wave form which are properly synchronized with respect to the transmitted signal and are applied to the line-deflection and field-deflection windings in the image-reproducing device 19 to effect a rectilinear scanning of the image screen in the device 19. The color burst signal which is substantially a few cycles of an unmodulated portion of the subcarrier wave signal having a desired reference phase is applied to the automatic-phase-control system 31 during the line-blanking period to control the frequency and phase of the signal developed in the signal generator 32. The signal developed in the generator 32 is applied substantially without phase delay to one input circuit and with substantially 90° phase delay through the unit 33 to another input circuit of the chromaticity-signal detector 14.

The modulated subcarrier wave signal which is a component of the color video-frequency signal derived by the detector 12 is amplified in the unit 13 and applied to a third input circuit of the detector 14. The unit 14 effects the derivation of quadrature components of the subcarrier wave signal, specifically, the I and Q signals, from which, as will be explained more fully hereinafter, the apparatus 17 develops G, R, and B color signals. In order to apply I and Q signals of the proper polarities to the unit 17, in the embodiment under consideration, —I and —Q signals are derived. It will be understood that signals of any polarity may be derived, such polarity being determined by the polarity of the signals required in the unit 17 and the number of phase reversals of the derived signals in being translated from the unit 14 to the unit 17. The —Q signal is derived by the detector 14 essentially by heterodyning the signal developed in the generator 32, and which is phase-shifted by 90° by the unit 33, with the modulated subcarrier wave signal applied to the unit 14 from the amplifier 13. The heterodyning of these signals, if they are in proper phase relation as explained in the previously mentioned "Electronics" article, is effective to derive the modulation component at a desired phase angle of the modulated subcarrier wave signal, specifically, the component —Q. Similarly, at another phase angle of the subcarrier wave signal, the modulation component —I is derived by heterodyning the subcarrier wave signal and the signal generated by the unit 32 and directly applied to the detector 14. To obtain the above-described proper phase relations between the signal developed by the generator 32 and the subcarrier wave signal, the color-synchronizing signal by means of the automatic-phase-control system 31 controls the frequency and phase of the signal developed by the generator 32.

The —I signal, having a band width of approximately 1.5 megacycles, is translated through the network 15, phase-inverted by the unit 20, and applied as a +I signal to the matrixing apparatus 17. The —Q signal, having a band width of approximately 0.5 megacycle, is translated through the network 16 and also applied to the apparatus 17 as a —Q signal. As will be explained more fully hereinafter, the apparatus 17 develops from the applied +I and —Q signals and from the luminance signal —Y applied thereto, color signals —R, —B, and —G representing, respectively, the red, blue, and green color of the image. The signals —R, —B, and —G are individually applied to the amplifiers 18R, 18B, and 18G, respectively, wherein they are amplified and phase-inverted to become +R, +B, and +G signals which are applied to different ones of the control electrodes of the image-reproducing device 19, individually to control the intensities of different beams in the device 19. This intensity modulation of the cathode beams together with their alignment and the resultant excitation of different color phosphors on the image screen of the device 19 is effective to cause a color image to be reproduced on such screen.

The automatic-gain-control or (AGC) signal developed in the unit 12 is effective to control the amplification of one or more of the stages in the unit 10, thereby to maintain the signal input to the detector 12 and to the sound-reproducing apparatus 34 within a relatively narrow range for a wide range of received signal intensities. The sound-signal modulated wave signal, having been selected and amplified in the unit 10, is applied to the sound-reproducing apparatus 34. Therein it is amplified and detected to derive the sound-signal modulation components which may be further amplified and then reproduced in the reproducing device of the unit 34.

*Description of matrixing apparatus of Fig. 1*

Referring now to the matrixing apparatus 17 of Fig. 1, as mentioned above and as will be made clear hereinafter, the purpose of the apparatus 17 is to develop from a pair of signals, specifically, from +I and —Q signals applied thereto and individually representative of different video-frequency color components and collectively representative of the chromaticity of an image, other signals, specifically, —(R–Y), —(B–Y), and —(G–Y) signals representative of other different video-frequency components, that is, respectively, the red, blue, and green components and collectively representative of the chromaticity of the image. The apparatus 17 comprises a pair of input circuits for individually supplying individual ones of the pair of signals +I and —Q applied to the unit 17. More specifically, such input circuits comprise a pair of current amplifiers 40 and 41 having input circuits coupled, respectively, through the pairs of terminals 22, 22 and 23, 23 to the units, respectively, 20 and 16 and for developing, respectively, —I and +Q signals in the output circuits of the units 40 and 41. Such amplifiers may be of the conventional pentode type and are commonly known as constant-current amplifiers since variations in the impedances of the anode load circuits thereof have negligible effects on the current amplification of such amplifiers. In other words, the current developed in the output circuits of such amplifiers is substantially proportional only to the potentials supplied to the control electrodes thereof. For reasons to be explained more fully hereinafter, the amplifiers 40 and 41 may have adjustable gain controls or may have fixed gains of such proportion as to obtain predetermined relative magnitudes of the —I and +Q signals which are in the form of currents developed in the output circuits thereof. It should be understood that, in practice, if other than simple diode demodulators are utilized for the detector 14, the units 40 and 41 may be inherent parts of the more complex demodulators and are, therefore, represented herein as units separate from the unit 14 solely to simplify the explanation of the operation of the unit 17.

The matrixing apparatus 17 also comprises a first impedance network including a phase inverter having a load circuit and coupled to the aforementioned input circuits and to the output circuits of the amplifiers 40 and 41 for developing in the load circuit from the —I and +Q signals a phase-inverted composite signal. More specifically, the first impedance network comprises a pair of resistors 42 and 43 connected in series between the high-potential terminals of the output circuits of the amplifiers 40 and 41 and a phase inverter, specifically, the circuit including a triode 44 having an anode load resistor 50 coupled to the positive terminal of a source of potential B+. The control electrode of the triode 44 is connected through a coupling condenser 45 to the junction of the resistors 42 and 43 and through a biasing resistor 46 of relatively high impedance to the junction of a pair of resistors 47 and 48 connected in series with a resistor 49 between the cathode of the tube 44 and ground. In the circuit under consideration, ground is at B— potential. The resistors 47 and 48 are connected across the pair of input terminals 24, 24 and, thus, to the output circuit of the video-frequency amplifier 21 for application of the brightness signal —Y to the cathode circuit of the tube 44. The resistors 42 and 43, as will be explained hereinafter, are proportioned with respect to each other and with respect to the magnitudes of the currents applied thereto from the amplifiers 40 and 41 to develop on the control electrode of the triode 44 a composite signal having predetermined relative proportions of the —I and +Q applied signals. The condenser 45 is a conventional coupling condenser comprising with the circuit including the resistors 46 and 49 a biasing circuit for the triode 44 so that the triode 44 operates on a linear portion of the characteristic curve thereof. The magnitude of the condenser 45 is such as to block the translation of unidirectional potentials, such as the potential B+ from the units 40 and 41 while being effectively a low-impedance conductor for all video-frequency signals. The resistor 46 is of such magnitude as effectively to be an infinite impedance for video-frequency signals and is combined with the cathode resistors 47, 48, and 49 to effect the desired unidirectional bias on the control electrode of the tube 44.

The matrixing apparatus also includes a second impedance network coupled to the input circuits, specifically, the units 40 and 41 and to the load circuit including the resistor 50 and jointly responsive to the aforementioned pair of signals —I and +Q and the composite signal developed across the load circuit by the triode 44 for developing in the resistor 50 a resultant signal, specifically, the —(B–Y) signal and for developing in the second network from at least one of the pair of signals —I and +Q and the resultant signal —(B–Y) at least another one of the other different components. More specifically, such network comprises a resistive path including a pair of resistors 51 and 52 connected in series between the high-potential terminals of the output circuits of the amplifiers 40 and 41 and also comprises a pair of high-frequency video-frequency signal-peaking networks 53 and 54 also connected in series with each other and in parallel with the resistors 51 and 52. The common junction of the resistors 51 and 52 and of the network 53 and 54, being an intermediate terminal in the resistive path, is coupled through a signal-rejection circuit 55, for blocking signals at frequencies equal to the subcarrier wave-signal frequency, to the anode resistor 50 and is also coupled through a pair of output terminals 26, 26 to the power amplifier 18B. The resistors 51 and 52, as will be explained more fully hereinafter, are proportioned with respect to each other and with respect to the —I and +Q currents applied thereto to develop potentials across individual ones thereof for the components of the —I and +Q currents flowing therethrough such that when these potentials are algebraically added to the potential developed at the junction of the resistors 51 and 52 by the triode 44 and the anode load resistor 50 signals representative of red and green of the image, respectively, are developed at the pairs of output terminals 25, 25 and 27, 27 which are connected to the resistors 51 and 52. The grounded one of each of the pairs of terminals 25, 25, 26, 26, and 27, 27 is a reference terminal with respect to which signals are developed on the other terminal of each pair of terminals.

*Operation of matrixing apparatus of Fig. 1*

Prior to considering the details of operation of the matrixing apparatus 17 of Fig. 1, it will be helpful to consider generally the manner of operation of such apparatus to develop initially desired —(R–Y), —(B–Y), and —(G–Y) color-difference signals. In considering such general explanation, it will be helpful to refer to the vector diagram of Fig. 2*a*, this diagram representing the relative relations in phase and magnitude of the modulation components ±I and ±Q with respect to each other and with respect to the desired color-difference signals —(R–Y), —(B–Y), and —(G–Y) as these signals appear as moduation components on the modulated subcarrier wave signal applied to the chromaticity-signal detector 14 of Fig. 1. As explained previously herein, —I and —Q signals are derived by the detector 14 and after band-width limiting and phase inversion the —I derived signal is applied as a +I signal to the amplifier 40 while the —Q derived signal after band-width limiting is applied as a —Q signal to the amplifier 41. The amplifiers 40 and 41 develop in the output circuits thereof, respectively, as will be discussed more fully hereinafter, properly proportioned magnitudes of currents representative of —I and +Q signals.

Considering now the vector diagram of Fig. 2*a*, it becomes apparent that the desired color-difference signals —(R–Y), —(B–Y), and —(G–Y) can be developed from the —I and +Q signals by combining proper proportions and polarities of the latter signals. Thus, a signal —(B–Y) can be developed by combining proper proportions of the +Q and —I signals with phase inversion. Having the desired —(B–Y) signal, the desired —(R–Y) signal can be obtained by a combination of the proper proportions of the —(B–Y) and —I and +Q signals and, similarly, the desired —(G–Y) signal can be obtained by the proper proportions of the —(B–Y) and —I and +Q signals. In one type of television system these proportions are defined as follows:

$$-(B-Y)=+1.11I-1.70Q \quad (1)$$

$$-(R-Y)=-.96I-.62Q \quad (2)$$

$$-(G-Y)=+.27I+.65Q \quad (3)$$

Such proportions are determined by the primary colors employed in the television system and by other factors relating to color fidelity in image reproduction. It should be understood that the relations defined by Equations 1–3, inclusive, are exemplary only and other relations may be employed equally well without departing from the invention if different primary colors are employed.

Considering now the matrixing apparatus 17 of Fig. 1, in general, a desired composite signal is developed at the junction of the resistors 42 and 43 by proper proportioning of the magnitudes of these resistors to combine desired amounts of —I and +Q potentials developed thereacross by the currents flowing therethrough. Ignoring for the moment the effect of the —Y brightness signal applied to the cathode of the tube 44, in other words, assuming there is no connection between the cathode and the pair of terminals 24, 24, the triode 44 phase-inverts and amplifies this composite signal to develop a phase-inverted composite signal of predetermined magnitude at the junction of the resistors 51 and 52. As will be discussed more fully hereinafter, the relative magnitudes of the resistors 42, 43, 51, and 52, with due consideration for the impedance effects of the other circuit elements, such as the phase inverter including the triode 44, are so proportioned that the current flowing through the resistors 51 and 50 and the current flowing through the resistors 52 and 50 combine with the composite signal developed across the resistor 50 by the triode 44 to develop the aforementioned —(B–Y) signal across the resistor 50. The magnitude of the resistor 51 is proportioned so that the current —I flowing therethrough from the output circuit of the amplifier 40 and the +Q current flowing through the resistors 42, 43, and 51 develop a potential drop across the resistor 51 of such magnitude that when the potential across the resistor 51 is added to the potential representative of the —(B–Y) signal at the junction of the resistors 51 and 52, the —(R–Y) signal is developed across the pair of output terminals 25, 25. The resistor 52 is similarly proportioned so that the —I current flowing through the resistors 42, 43, and 52 and the +Q current flowing through the resistor 52 develop at the output terminals 27, 27 the desired —(G–Y) signal. Thus, with the assumption that no —Y brightness signal is applied to the cathode of the tube 44, desired color-difference signals —(R–Y), —(B–Y), and —(G–Y) are developed, respectively, at the pairs of terminals 25, 25, 26, 26, and 27, 27. When a —Y signal having a magnitude related to the magnitudes of the Y components of the color-difference signals is applied to the cathode of the tube 44 and is developed across the anode load resistor 50, such —Y signal is applied equally to the three pairs of terminals 25, 25, 26, 26, and 27, 27. Consequently, it combines with the +Y components of the color-difference signals at these terminals to develop thereat the desired color signals —R, —B, and —G. As stated previously herein, these signals are amplified and phase-inverted by the amplifiers 18R, 18B, and 18G, respectively, and are applied to control electrodes in the image-reproducing device 19 to develop the color image on the image screen thereof. The details of the proportioning of the different circuit elements just considered will now be explained in more detail.

In order more clearly to understand the above-mentioned proportioning of the circuit elements of the apparatus 17 of Fig. 1, it will be helpful to consider a simplified equivalent circuit thereof, such as represented by Fig. 2*b*, wherein only those elements essential to such proportioning are represented. Mathematical relationships defining the currents, voltages, and impedances at different points in the circuit of Fig. 2*b* will be developed to provide equations which define more accurately the proportioning of the different circuit elements. The signal generators $-k_i$I and $+k_q$Q represent the current amplifiers 40 and 41, respectively, of Fig. 1, the coefficients $-k_i$ and $+k_q$ defining the relative magnitudes and polarities of the currents I and Q. The signal generator $-k_y$Y similarly represents the source of the brightness or luminance signal applied through the terminals 24, 24 in the apparatus 17 of Fig. 1. The connection between the junction of the resistors 42 and 43 and the control electrode of the tube 44 in Fig. 2*b* is represented as a direct conductive connection since the matrixing apparatus 17 is designed to matrix only the video-frequency signals applied to the control electrode of the tube 44 and such signals are effectively directly connected thereto through the low impedance of the condenser 45.

For the type of television system under consideration, the relationships of the luminance or brightness signal Y and of the I, Q, B, R, and G color-difference signals are defined as follows:

$$Y=0.59G+0.30R+0.11B \qquad (4)$$

$$Q=-0.52G+0.21R+0.31B \qquad (5)$$

$$I=-0.28G+0.60R-0.32B \qquad (6)$$

By conventional mathematical analysis, the currents flowing out of the generators $-k_i$I and $+k_q$Q can be defined in terms of the desired signals —R and —G developed at the pairs of output terminals 25, 25 and 27, 27, respectively. From such conventional circuit equations and the relationships provided by Equations 4–6, inclusive, above, the following equations may be derived in a straightforward manner:

$$k_i=\frac{1}{0.32r_{51}} \qquad (7)$$

$$r_{42}+r_{43}=-\frac{1}{0.28k_i} \qquad (8)$$

$$k_q=\frac{1}{0.21(r_{42}+r_{43})} \qquad (9)$$

$$r_{52}=\frac{1}{0.31k_q} \qquad (10)$$

where $r$ represents the resistance of the resistor identified by the numerals used as the subscript thereof.

By further conventional circuit analysis in terms of currents and potentials developed at different points in such circuit, the potential —B developed at the output terminals 26, 26 and at the junction of the resistors 51, 52 coupled to the output circuit of the tube 44 is definable in terms of the input potentials to the control electrode and cathode of the tube 44 and the transconductance $g_m$ of the tube 44. The potential applied to the cathode is, as represented, $-k_y$Y and the potential applied to the control electrode of the tube 44 is definable in terms of the fractional portions of the —I and +Q potentials across the resistors 42 and 43 and developed at the junction of the resistors 42 and 43. The parameters Y, —I, and +Q so determined are defined by Equations 4–6, inclusive, above in terms of G, R, and B and may be so expressed to define the above-mentioned —B potential at the terminals 26, 26. The equation developed from such an analysis and defining the potential —B at the output terminals 26, 26 will have terms B, G, and R and complex coefficients for such terms. Since it is axiomatic that the terms G and R must be equal to zero in such equation since only a potential —B is developed at the terminals 26, 26, the coefficients of the terms G and R may be equated to zero. In this manner, relations for the unknown terms in such complex coefficients may be obtained. The following relations are obtainable in this manner:

$$\frac{r_{43}}{r_{43}+r_{42}}=1-\left(0.59k_y+\frac{1}{g_m}r_{52}\right) \qquad (11)$$

$$\frac{r_{43}}{r_{43}+r_{42}}=0.30k_y+\frac{1}{g_m}r_{51} \qquad (12)$$

$$g_m=\frac{8}{r_{50}}+\frac{9}{r_{52}}+\frac{9}{r_{51}} \qquad (13)$$

Using the Equations 1–13, inclusive, above, values for all of the critical circuit elements of the apparatus 17 of Fig. 1 may be determined. For example, considering initially desirable performance considerations for the circuit as a unit, the impedance $Z_R$ looking into the output terminals 25, 25 from the generator $-k_i$I may be selected as 5000 ohms in order to obtain a desired band width of approximately 1.5 megacycles for such circuit and adequate gains. The impedance $Z_R$ may be defined as follows:

$$Z_R=\frac{I \text{ component in the signal } (R-Y)}{I \text{ input signal}} \quad (14)$$

The numerator of the above equation equals .96 as defined by Equation 2 above and the denominator of Equation 14 is $-k_i$ which is in turn defined by Equation 7 above. Thus, Equation 14 may be expressed as:

$$Z_R=\frac{.96}{\frac{1}{0.32r_{51}}} \quad (15)$$

Rearranging Equation 15, simplifying, and solving for $r_{51}$:

$$r_{51}=\frac{Z_R}{0.307}=16{,}300 \text{ ohms} \quad (16)$$

Similarly, by utilizing the relations expressed in Equations 7, 8, and 16:

$$r_{42}+r_{43}=\frac{8r+51}{7}=18{,}600 \text{ ohms} \quad (17)$$

and by utilizing the relations expressed in Equations 9, 10, and 17:

$$r_{52}=\frac{1}{0.31k_q}=\frac{21(r_{42}+r_{43})}{31}=12{,}640 \text{ ohms} \quad (18)$$

The term $k_i$ is definable by utilizing the relations of Equations 7 and 16 as follows:

$$k_i=\frac{1}{0.32r_{51}}=192 \text{ micromhos} \quad (19)$$

Similarly, from Equations 9 and 17:

$$k_q=\frac{1}{0.21(r_{42}+r_{43})}=255 \text{ micromhos} \quad (20)$$

The anode load resistance 50 is selected as one suitable for the tube employed to give the maximum resistance for the desired gain. The tube selected preferably should be capable of supplying an adequate current to the inherent shunt capacitances (not shown) at the pairs of output terminals 25, 25, 26, 26 and 27, 27 for the highest frequencies desired, for example, 3 megacycles. If the tube is one-half of a 6AB4 type, then $r_{50}$ may be 15,000 ohms. Utilizing this value for $r_{50}$ and the relations of Equations 13, 16, and 18:

$$g_m=2009 \text{ micromhos} \quad (21)$$

From the relations of Equations 11, 12, 16, 18, and 21:

$$k_y=1.044 \quad (22)$$

By utilizing the expressions of Equations 12, 16, 17, and 21:

$$r_{43}=6360 \text{ ohms} \quad (23)$$
$$r_{42}=12{,}230 \text{ ohms} \quad (24)$$

To summarize the above explanation, the unit 17 develops —R, —B, and —G color signals from —I, +Q, and —Y signals by utilizing a single-tube matrixing operation. To effect such development, complex currents of the —I and +Q signals flow in different portions of the matrixing apparatus to develop the color-difference signals —(B–Y), —(R–Y), and —(G–Y) to each of which the —Y signal is added for developing, respectively, —B, —R, and —G color signals. Among the current paths for the —I and +Q currents to develop the —(B–Y) color-difference signal are, for the —I current, through the resistors 42, 43, 52, and 50 in that order and, for the +Q current, through the resistors 43, 42, 51, and 50 in that order. The flow of —I and +Q currents through the resistors 42 and 43 causes a composite signal to be developed at the control electrode of the tube 44 and a phase-inverted version of such composite signal to be developed at the anode thereof. The later signal combines with the signals caused by the aforementioned currents of —I and +Q flowing through the resistor 50 to develop the —(B–Y) signal at the anode of the tube 44. The —Y signal applied to the cathode of the tube 44 combines in the anode circuit thereof with the —(B–Y) signal to develop the —B color signal. From the above, it should be apparent that the developing of the —B signal requires proper proportioning of the magnitudes of the elements 42, 43, 51, 52, and of at least a few of the circuit elements in the phase inverter including the tube 44. To develop the —(R–Y) signal, the above-mentioned +Q current flowing through the resistor 51 combines with the —I current flowing therethrough and the —(B–Y) signal developed at the anode of the tube 44. Similarly, to develop the —(G–Y) signal, the above-mentioned —I current flowing through the resistor 52 combines with the +Q current flowing therethrough and the aforementioned —(B–Y) signal. Since the —Y signal at the anode of the tube 44 is applied equally to all of the color-difference signals, the latter —(R–Y) and —(G–Y) signals become, respectively, —R and —G.

*Description and operation of portion of television receiver of Fig. 3*

The matrixing apparatus 17 of Fig. 1, as has been previously described and explained, utilizes I, Q, and Y signals to develop R, B, and G color signals. Such matrixing apparatus is performing more matrixing operations than may be desired when the above-mentioned color signals are being developed therein. For example, it may be desirable to utilize only the derived I and Q signals to develop color-difference signals R–Y, B–Y, and G–Y in the matrixing apparatus. The luminance or brightness signal Y may then be combined with such color-difference signals at another point in the television receiver, for example, in the image-reproducing device. The portion of the television receiver represented by Fig. 3 utilizes only the derived I and Q signals to develop color-difference signals which are later combined with the brightness signal Y in the image-reproducing device.

Since the major portion of the units and circuit elements of the apparatus of Fig. 3 are similar to corresponding units or elements in the apparatus of Fig. 1, such units are, therefore, designated by the same reference numerals. A few units and circuit elements in the apparatus of Fig. 3 correspond to elements in the apparatus of Fig. 1 but differ therefrom and are, therefore, designated by the same reference numerals with 300 added thereto.

The portion of the receiver represented by Fig. 3 is substantially a duplicate of the corresponding portion of the receiver of Fig. 1 except for the cathode circuit of the image-reproducing apparatus 319 and the coupling of such cathode circuit to the pair of terminals 24, 24 and, thus, effectively to a source of brightness or luminance signal Y, such as the unit 21 of Fig. 1. The input circuits of the current amplifiers 40 and 41 are such as to be coupled to sources of —I and +Q signals, respectively, for example, units such as 20 and 16 of Fig. 1.

The matrixing apparatus 317 of Fig. 3 operates in essentially the same manner as the apparatus 17 of Fig. 1 previously discussed herein except that no brightness signal Y is applied to the cathode circuit of the tube 44 and, therefore, the signals developed at the pairs of terminals 25, 25, 26, 26, and 27, 27 are, respectively, the color-difference signals —(R–Y), —(B–Y), and —(G–Y). The latter signals are individually amplified by different ones of the amplifiers 18R, 18B, and 18G and individually applied to different ones of the control electrodes in the image-reproducing apparatus 319. The brightness or luminance signal —Y is applied through the pair of terminals 24, 24 to each of the cathodes in the image-reproducing device 319 wherein it effectively combines with each of the color-difference signals to develop the color signals R, B, and G. These color signals are used in the device 319 in the manner previously explained herein with reference to Fig. 1.

*Description and operation of portion of television receiver of Fig. 4*

Considering now the modified matrixing apparatus represented by Fig. 4, since the major portion of the units and circuit elements therein are similar to corresponding units or elements in the apparatus of Fig. 1, such units and elements are designated by the same reference numerals. Since the apparatus of Fig. 4 corresponds to the apparatus 17 of Fig. 1 but differs therefrom in a manner to be described hereinafter, such apparatus is designated by the same reference numeral 17 with 400 added thereto, that is, it is designated as 417. The new circuit elements in the apparatus 417 are designated by the reference numerals 70 and 71.

The apparatus 417 differs from the apparatus of Fig. 1 in that potentiometers 70 and 71 replace the pairs of resistors 42, 43 and 51, 52, respectively, of Fig. 1. Since the fractional portions of the potentiometers 70 and 71 between the intermediate terminals and the end terminals thereof correspond to the pairs of resistors just mentioned, the apparatus 417 operates in a manner quite similar to that of Fig. 1. The ultilization of potentiometers instead of fixed resistors permits more critical adjustment of the fractional portions of the potentiometers to compensate for inherent factors in the apparatus.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a color video-frequency signal-translating system, a matrixing apparatus for developing from a pair of signals, individually representative of different video-frequency color components and collectively representative of the chromaticity of an image, other signals representative of other different video-frequency color components collectively representative of the chromaticity of the image comprising: a pair of input circuits for individually supplying individual ones of said pair of signals; a first impedance network including a phase inverter having a load circuit and coupled to said input circuits for developing from said pair of signals a phase-inverted composite signal in said load circuit; and a second impedance network coupled to said input circuits and said load circuit and jointly responsive to said composite signal and said pair of signals for developing in said load circuit a resultant signal which is representative of one of said other different components and for developing in said second network from at least one of said pair of signals and said resultant signal at least another one of said other different signals.

2. In a color video-frequency signal-translating system, a matrixing apparatus for developing from I and Q signals, individually representative of different video-frequency color components and collectively representative of the chromaticity of an image, other signals R–Y, B–Y, and G–Y representative, respectively, of the red, blue, and green video-frequency color components and collectively representative of the chromaticity of the image comprising: a pair of input circuits for individually supplying individual ones of said I and Q signals; a first impedance network including a phase inverter having a load circuit and coupled to said input circuits for developing from said I and Q signals in said load circuit a phase-inverted composite signal; and a second impedance network coupled to said input circuits and said load circuit and jointly responsive to said composite signal and said I and Q signals for developing in said load circuit a resultant signal B–Y and for developing in said second network from at least one of said I and Q signals and said resultant signal B–Y at least one of said R–Y and G–Y signals.

3. In a color video-frequency signal-translating system, a matrixing apparatus for developing from a pair of signals, individually representative of different video-frequency color components and collectively representative of the chromaticity of an image, other signals representative of other different video-frequency color components collectively representative of the chromaticity of the image comprising: a pair of constant-current devices for individually supplying individual currents representative of said pair of signals; a first impedance network including a phase inverter having a load circuit and coupled to said constant-current devices for developing from said currents and in said load circuit a phase-inverted composite signal; and a second impedance network coupled to said constant-current devices and said load circuit and jointly responsive to said composite signal and said currents for developing in said load circuit a resultant signal which is representative of one of said other different components and for developing in said second network from at least one of said currents and said resultant signal at least another one of said other different signals.

4. In a color video-frequency signal-translating system, a matrixing apparatus for developing from a pair of signals, individually representative of different video-frequency color components and collectively representative of the chromaticity of an image, other signals representative of other different video-frequency color components collectively representative of the chromaticity of the image comprising: a pair of input circuits for individually supplying individual ones of said pair of signals; a first impedance network including a pair of series-connected resistors coupled between said input circuits for developing a composite signal from said pair of signals and including a phase inverter coupled to said resistors and having a load circuit for developing a phase-inverted form of said composite signal in said load circuit; and a second impedance network coupled to said input circuits and said load circuit and jointly responsive to said composite signal and said pair of signals for developing in said load circuit a resultant signal which is representative of one of said other different components and for developing in said second network from said pair of signals and said resultant signal said other different signals.

5. In a color video-frequency signal-translating system, a matrixing apparatus for developing from a pair of signals, individually representative of different video-frequency color components and collectively representative of the chromaticity of an image, other signals representative of other different video-frequency color components collectively representative of the chromaticity of the image comprising: a pair of input circuits for individually supplying individual ones of said pair of signals; a first impedance network including a phase inverter having a load circuit and coupled to said input circuits for developing from said pair of signals in said load circuit a phase-inverted composite signal; and a second impedance network including a pair of series-connected resistors and a reference terminal coupled to said input circuits and said load circuit and jointly responsive to said composite signal and said pair of signals for developing in said load circuit a resultant signal which is representative of one of said other different components and for developing in one of said resistors with respect to said reference terminal from at least one of said pair of signals and said resultant signal at least another one of said other different signals.

6. In a color video-frequency signal-translating system, a matrixing apparatus for developing from a pair of signals, individually representative of different video-frequency color components and collectively representative of the chromaticity of an image, other signals representative of other different video-frequency color components collectively representative of the chromaticity of the image comprising: a pair of input circuits for individually supplying individual ones of said pair of signals; a first impedance network including a resistive path having a pair of terminals and an intermediate terminal, said pair of terminals being individually coupled to different ones of said input circuits for developing a composite signal at said intermediate terminal from said pair of signals and including a phase inverter having a load circuit and coupled to said intermediate terminal for developing in said load circuit from said composite signal a phase-inverted composite signal; and a second impedance network coupled to said input circuits and said load circuit and jointly responsive to said composite signal and said pair of signals for developing in said load circuit a resultant signal which is representative of one of said other different components and for developing in said second network from at least one of said pair of signals and said resultant signal at least another one of said other different signals.

7. In a color video-frequency signal-translating system, a matrixing apparatus for developing from a pair of signals, individually representative of different video-frequency color components and collectively representative of the chromaticity of an image, other signals representative of other different video-frequency color components collectively representative of the chromaticity of the image comprising: a pair of input circuits for individually supplying individual ones of said pair of signals; a first impedance network including a phase inverter having a load circuit and coupled to said input circuits for developing from said pair of signals in said load circuit a phase-inverted composite signal; and a second impedance network including a resistive path having a pair of terminals and an intermediate terminal, said pair of terminals being individually coupled to different ones of said input circuits and said intermediate terminal being coupled to said load circuit, said second network being jointly responsive to said composite signal and said pair of signals for developing at said intermediate terminal a resultant signal which is representative of one of said other different components and for developing at one of said pair of terminals from at least one of said pair of signals and said resultant signal at least another one of said other different signals.

8. In a color video-frequency signal-translating system, a matrixing apparatus for developing from a pair of signals, individually representative of different video-frequency color components and collectively representative of the chromaticity of an image, other signals representative of other different video-frequency color components collectively representative of the chromaticity of the image comprising: a pair of input circuits for individually supplying individual ones of said pair of signals; another input circuit for supplying a signal representative of the brightness of the image; a first impedance network including a phase inverter having a load circuit and coupled to said pair of input circuits and said other input circuit for developing from said pair of signals and said brightness signal in said load circuit a phase-inverted composite signal and said brightness signal; and a second impedance network coupled to said pair of input circuits and said load circuit and jointly responsive to said composite signal and said pair of signals for developing in said load circuit a resultant signal which is representative of one of said other different components and for developing in said second network from at least one of said pair of signals and said resultant signal at least another one of said other different signals and for translating said brightness signals.

9. In a color video-frequency signal-translating system, a matrixing apparatus for developing from a pair of signals, individually representative of different video-frequency color components and collectively representative of the chromaticity of an image, other signals representative of other different video-frequency color components collectively representative of the chromaticity of the image comprising: a pair of input circuits for individually supplying individual ones of said pair of signals; another input circuit for supplying a signal representative of the brightness of the image; a first impedance network including a phase inverter having a pair of control electrodes and a load circuit one of said electrodes being coupled to said pair of input circuits and the other of said electrodes being coupled to said other input circuit for developing from said pair of signals and said brightness signal in said load circuit a phase-inverted composite signal and said brightness signal; and a second impedance network coupled to said pair of input circuits and said load circuit and jointly responsive to said composite signal and said pair of signals for developing in said load circuit a resultant signal which is representative of one of said other different components and for developing in said second network from at least one of said pair of signals and said resultant signal at least another one of said other different signals and for translating said brightness signal.

10. In a color video-frequency signal-translating system, a matrixing apparatus for developing from a pair of signals, individually representative of different video-frequency color components and collectively representative of the chromaticity of an image, other signals representative of other different video-frequency color components collectively representative of the chromaticity of the image comprising: a pair of input circuits for individually supplying individual ones of said pair of signals, said circuits including individual pairs of output terminals having a terminal common to said pairs; a first impedance network including a resistive network having two terminals individually coupled to said pair of output terminals and a terminal intermediate said two terminals and responsive to said pair of signals for developing therefrom a composite signal between said intermediate terminal and said common terminal and including a phase inverter having a load circuit and coupled to said intermediate and common terminals for developing in said load circuit a phase-inverted form of said composite signal; and a second impedance network including a resistive network having two terminals individually coupled to different ones of said two terminals of said first impedance network and an intermediate terminal coupled to said load circuit and jointly responsive to said pair of signals and said inverted composite signal for developing in said load circuit a resultant signal which is representative of one of said other different components and for developing at one of said two terminals of said second network from at least one of said pair of signals and said resultant signal at least another one of said other different signals.

11. In a color video-frequency signal-translating system, a matrixing apparatus for developing from a pair of signals, individually representative of different video-frequency color components and collectively representative of the chromaticity of an image, other signals representative of other different video-frequency color components collectively representative of the chromaticity of the image comprising: a pair of input circuits for individually supplying individual ones of said pair of signals, said circuits including individual pairs of output terminals having a common ground terminal; a first impedance network including a resistive network having two terminals individually coupled to said pair of output terminals and a terminal intermediate said two terminals and responsive to said pair of signals for developing therefrom a composite signal between said intermediate terminal and said ground terminal and including a phase inverter having a load circuit and coupled between said intermediate and ground terminals for developing in said load circuit a phase-inverted form of said composite signal; and a second impedance network including a resistive network having two terminals individually coupled to different ones of said two terminals of said first impedance network and an intermediate terminal coupled to said load circuit and jointly responsive to said pair of signals and said inverted composite signal for developing in said load circuit a resultant signal which is representative of one of said other different components and for developing between one of said two terminals of said second network and ground from at least one of said pair of signals and said resultant signal at least another one of said other different signals.

12. In a color video-frequency signal-translating system, a matrixing apparatus for developing from a pair of signals, individually representative of different video-frequency color components and collectively representative of the chromaticity of an image, other signals representative of other different video-frequency color components collectively representative of the chromaticity of the image comprising: a pair of input circuits for individually supplying individual ones of said pair of signals, said circuits including individual pairs of output terminals having a terminal common to said pairs; a first impedance network including a voltage divider having two terminals individually coupled to said pair of output terminals and a terminal intermediate said two terminals and responsive to said pair of signals for developing therefrom a composite signal between said intermediate terminal and said common terminal and including a phase inverter having a load circuit and coupled to said intermediate terminal for developing in said load circuit a phase-inverted form of said composite signal; and a second impedance network including a voltage divider having two terminals individually coupled to different ones of said two terminals of said first-mentioned voltage divider and an intermediate terminal coupled to said load circuit and jointly responsive to said pair of signals and said inverted composite signal for developing in said load circuit a resultant signal which is representative of one of said other different components and for developing at one of said two terminals of said second-mentioned voltage divider from at least one of said pair of signals and said resultant signal at least another one of said other different signals.

13. In a color video-frequency signal-translating system a matrixing apparatus for developing from a pair of signals, individually representative of different video-frequency color components and collectively representative of the chromaticity of an image, other signals representative of other different video-frequency color components collectively representative of the chromaticity of the image comprising: a pair of constant-current amplifiers for individually supplying individual currents representative of said pair of signals, said amplifiers including individual pairs of output terminals each having a ground terminal; a first resistor circuit including a resistor having two end terminals individually coupled to said pair of output terminals and a terminal intermediate said two end terminals and responsive to said currents for combining predetermined proportions thereof to develop a composite signal between said intermediate terminal and said ground; a phase inverter having an input circuit coupled to said intermediate terminal and said ground and including an output load impedance having a terminal coupled to said ground for developing in said load impedance a signal representative of said composite signal inverted; and a second resistor circuit including a resistor having two end terminals individually coupled to different ones of said two end terminals of said first resistor circuit and having an intermediate terminal coupled to said output load impedance for combining said inverted composite signal and predetermined proportions of said currents flowing through said load impedance to develop a resultant signal in said load impedance representative of one of said other different components and for developing from said supplied currents and said resultant signal at different ones of said end terminals of said second circuit with respect to said ground signals representative of the other ones of said other different signals.

References Cited in the file of this patent

UNITED STATES PATENTS

| | | |
|---|---|---|
| 2,318,197 | Clark | May 4, 1943 |
| 2,635,140 | Dome | Apr. 14, 1953 |
| 2,657,257 | Lesti | Oct. 27, 1953 |
| 2,664,462 | Bedford | Dec. 29, 1953 |

OTHER REFERENCES

A Two-Color Direct-View Receiver for the RCA Color Television System, RCA, November 1949, 15 pages of spec., 2 shts. of drawings.